United States Patent Office 2,921,872
Patented Jan. 19, 1960

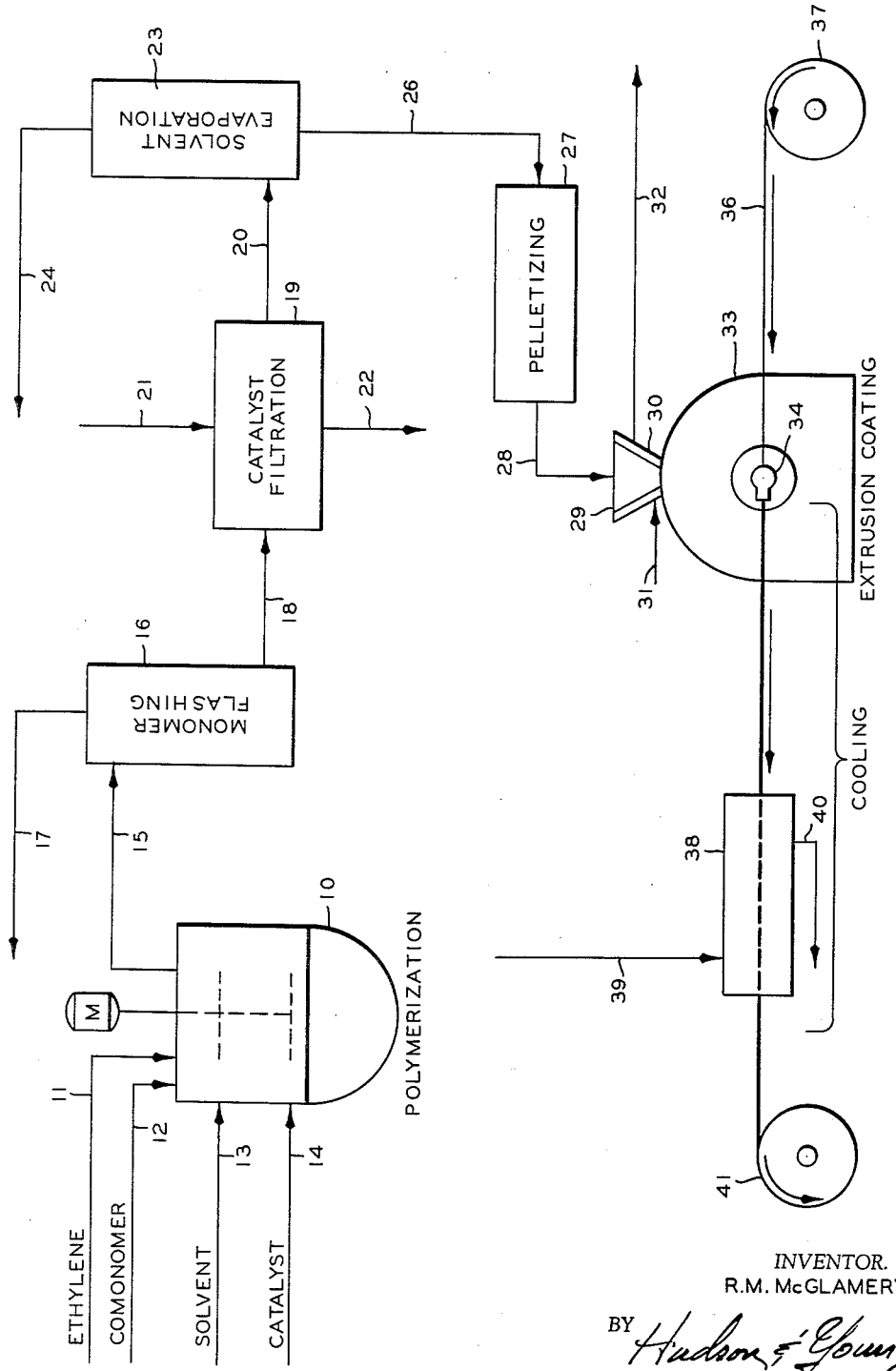

2,921,872

METHOD OF INSULATING AN ELECTRICAL CONDUCTOR WITH A COPOLYMER COMPRISING ETHYLENE AND PROPYLENE OR 1-BUTENE OR 2-BUTENE

Roger M. McGlamery, Bartlesville, Okla., assignor to Phillips Petroleum Company, a corporation of Delaware Application August 31, 1956, Serial No. 607,279

8 Claims. (Cl. 117—232)

This invention relates to a method of making an improved electrical insulating material and to the article produced thereby. In another aspect it relates to a method of providing an improved thermoplastic coating having resistance to heat-stress cracking. In one of its more specific aspects this invention relates to a method of insulating wire with an ethylene copolymer having a high softening temperature and good resistance to heat-stress cracking.

For some time polyethylene has been recognized as an excellent insulating material for electrical purposes, especially in high frequency applications. Commercial polyethylenes prepared under conditions of high temperatures and pressures are presently enjoying wide use in this field. A weakness of this material, however, is its relatively low softening point of about 220 to 223° F. which limits its application or requires the use of a protective jacket of some high softening resin such as nylon.

Recent developments in the polyethylene field have produced products having greater rigidity and higher softening temperatures than this commercial polyethylene. In addition to having improved physical properties, these new ethylene polymers can be produced at considerably lower temperatures and pressures than heretofore possible. In adapting these higher softening polyethylenes to electrical insulating uses, however, difficulties have been observed when the final product has been exposed to conditions of stress at elevated temperatures. Under such conditions coatings on wire have after a period of time exhibited a cracking or rupturing. This type of failure has been termed heat-stress cracking, as differentiated from environmental-stress cracking and considerable effort has been expended toward the solution of this problem. While heat-stress cracking can occur in other applications, it is of particular importance in the insulation of electrical wires which are subjected to elevated temperatures with winding, twisting, and tension, thereby developing considerable stresses in the surface of the coating materials.

I have discovered a method of providing an insulating coating which combines the features of improved heat resistance, having a relatively high softening temperature, and excellent resistance to heat-stress cracking. According to the practice of my invention this improved electrical insulation is provided by copolymerizing ethylene with propylene, 1-butene, and/or 2-butene in processes which utilize a catalyst under relatively low temperatures and pressures to yield copolymers having a density of at least 0.92, a softening temperature of at least 235° F. and a melt index of 5 or less, and applying said copolymer on an electrical conductor as a coating which is preferably continuous. The method of my invention yields an insulation having outstanding electrical characteristics, dimensional stability, flexibility over a wide temperature range, improved resistance to chemicals, and ability to withstand temperatures of 235° F. and above.

It is an object of my invention to provide a method for producing improved thermoplastic coatings suitable for electrical insulation. Another object is to provide a wire product coated with an improved insulation. It is another object of my invention to overcome the problem of heat-stress cracking in high density polyethylene coatings while retaining their characteristic of high softening temperature. It is still another object of my invention to provide a method of insulating an electrical conductor with a thermoplastic coating having improved resistance to heat-stress cracking. Other objects, advantages, and features of my invention will become apparent to those skilled in the art from the following detailed description.

The value of polyethylene as an electrical insulating material is well recognized. It is light, flexible, and has good dielectric properties. It is also easily extruded as a coating upon wires and other products. Improved polyethylene resins have been developed with even better electrical characteristics plus the ability to withstand higher temperatures with greater rigidity and better resistance to chemical attack. These improved polyethylenes have a density of about 0.94, usually 0.96 and above, and a softening temperature in the range of about 250 to 270° F. For the practice of my invention a copolymer of ethylene is produced by processes substantially the same as those employed for the production of these improved homopolymers above described. In a preferred method of preparing the copolymers for my invention, ethylene is polymerized with at least one of the monomers selected from the group consisting of propylene, 1-butene, and 2-butene, in the presence of a catalyst comprising chromium, a portion of which is hexavalent (preferably at least 0.1 percent by weight of the total catalyst) as chromium oxide associated with at least one oxide from the group consisting of silica, alumina, zirconia, and thoria. The total chromium content of the catalyst is preferably between 0.1 and 10 weight percent. Polymerization is ordinarily carried out at a temperature between 150 and 450° F., and the pressure of the reaction can vary over a wide range, for example, from atmospheric pressure to 1000 pounds per square inch absolute or higher; however, generally this reaction is known as low pressure polymerization. The reaction can be carried out in a gaseous phase; but when diluent is used the minimum pressure is that necessary to maintain the diluent in a liquid phase. Preferably a solvent is used which is liquid and inert under contacting conditions, such as hydrocarbon solvents, especially naphthenic hydrocarbons and paraffinic hydrocarbons of from 3 to 12 carbon atoms, for example, isooctane and cyclohexane. In such cases the reaction pressure is ordinarily in the range of 100 to 800 pounds per square inch absolute. The effluent withdrawn from the reactor comprises a solution of copolymer in solvent, and when slurry or suspended catalyst is used the solution also contains catalyst. Unreacted monomers are removed by flashing, and the solution with or without the addition of more solvent is filtered, centrifuged or the like to remove the catalyst. The catalyst-free solution is then passed to suitable recovery steps for removal of the solvent, such as by evaporation or flashing, and solid polymer is recovered in these steps or by precipitation. The solid polymer is ordinarily further processed in order to be placed in condition for storage. A suitable form is as pellets or granules which can be prepared by extrusion of the polymer into strands which are then cut or chopped in a pelletizer.

In preparing these copolymers the monomer feed is predominantly ethylene with amounts of comonomer ranging ordinarily from 3 to 20 and in some cases as high as 30 parts by weight per 100 parts of monomer feed. For copolymers having a softening temperature of 240° F. and above, it is preferred that the amount of comonomer in the total monomer feed not exceed 15 weight percent. The copolymers of my invention as produced by the above described process have a density of at least 0.92 and a softening temperature of at least 235° F. with a melt index of not more than 5 and preferably not over 1. Other methods of copolymerization which will yield high molecular weight polymers of this required density, melt index and softening temperature can also be employed, for example, processes employing catalyst systems comprising organometallic compounds such as triethylaluminum with titanium tetrachloride and mixtures of ethylaluminum halides with titanium tetrachloride.

Softening temperature as applied to these thermoplastic polymers and used in this specification refers to the ability of a particular polymer to support a standard load or withstand a force at elevated temperatures without substantial deformation. "Softness" of a polymer is a measure of its relative deformation under a standard load for a certain time interval at a particular temperature. The method for determining softness as used in this specification is that described in the article by Karrer, Davis, and Dieterich in Industrial and Engineering Chemistry (Analytical Edition) 2, 96 (1930). The softening temperature for a polymer is determined by plotting softness over a range of temperatures with temperature on the abscissa. As softness increases with temperature, the slope of the curve formed by the plot likewise increases, and the temperature at which the slope of the curve equals the tangent of 60° is, by definition, the softening temperature.

Softening temperature is to be distinguished from melting point which is a distinct physical property determinable for polymers exhibiting relatively high crystallinity. The melting point of a polymer is indicated as that temperature at which its cooling curve registers a plateau or inflection point. This plateau is quite pronounced for highly crystalline polymers and becomes less discernible for polymers having overall lesser crystallinity. The relative values of softening temperature and melting point will vary considerably for different polymers. In some cases the softening temperature is substantially higher, for example 10 or 15° F., than the melting point, and in other instances the difference is much less, some polymers even having softening temperatures, as defined, below their melting points. It should be understood, however, that the apparent physical changes of most polymers of the type concerned herewith are gradual as temperature changes and are not abrupt. Even at temperatures somewhat above both the melting and softening temperatures these polymers resist deformation and do not become fluid until heated still further. For example, polyethylene prepared in the presence of a chromium oxide-silica-alumina catalyst by a process substantially as described above in certain forms exhibits a melting point of about 250 to 253° F., a softening temperature of about 260 to 264° F. and does not become fluid until heated to temperatures about 270° F. and above.

Wire is coated with the ethylene copolymer by techniques well known in the art. A preferred method of wire coating is by means of a standard plastics extruder fitted with a wire-coating cross-head through which the wire to be coated passes. In such an apparatus the polymer is maintained at a temperature sufficiently high to keep it fluid, and as pressure is exerted by the screw in the extruder the wire emerges coated with a continuous sheath of plastic. Another method of applying insulant to a conductor is by sandwiching the wire between two strips of calendered polymer ribbon and shaping plastic around the wire with a pair of grooved steel rollers. A coating can also be applied by fusing a helical winding of calendered polymer film into a continuous coating upon the wire. In all of these coating operations the polymer is worked while at a temperature considerably above its softening point. It is important that the coating be cooled uniformly so that the surface of the material does not become rigid while the interior remains fluid, as this results in the production of voids at the polymer-wire interface; and when the wire is used in electrical applications, such voids become points of ionization subjecting the polymer composition to degregation and breakdown in dielectric strength. To achieve this uniform cooling and avoid uneven density changes within the coating, it is preferred that the coatings be gradually cooled from the extrusion or working temperature to a temperature below their melting and softening temperatures. A thin coating such as would be applied to small wires can be passed directly into cooling water since a uniform cooling for such a film can be effected fairly rapidly. However, if the coatings are fairly thick, as for example about 0.05 inch, they should be cooled gradually in order to insure an even cooling within the film. It is most important to avoid a quenching effect for such coatings. Slow cooling provides a further advantage by producing greater rigidity in the copolymers used for my invention.

Referring now to the drawing which depicts schematically one embodiment of the process of my invention, polymerization is carried out in reactor 10. Ethylene is fed to reactor 10 through line 11 and a suitable comonomer (propylene, 1-butene or 2-butene) is fed through line 12. Solvent and catalyst enter reactor 10 through lines 13 and 14, respectively. Reactor effluent is removed continuously through line 15 to monomer flashing zone 16 wherein unreacted ethylene and comonomer are removed through line 17 and returned to the reaction. A solution of copolymer and solvent with catalyst in suspension passes through line 18 to filter 19 where catalyst is removed, catalyst-free solution leaving through line 20. Fresh solvent can be introduced through line 21 to flush catalyst from the filters through line 22 in a cyclic operation. Solvent is removed from the solution in a series of evaporation steps represented by evaporator 23. Solvent passes overhead through line 24 while copolymer passes by conduit 26 to pelletizer 27. Particles of solid copolymer are then conveyed by conduit 28 to hopper 29 having a jacket 30 heated with superheated steam entering the jacket through line 31 and leaving through line 32. The copolymer is thus heated to a fluid condition and passes into extruder 33 from which it is extruded as a coating on a wire passing through extrusion crosshead 34. Wire 36 is fed continuously through the crosshead 34 from spool 37. The polymer coating on the wire as it leaves the extruder is cooled uniformly in an air space before entering trough 38 wherein the polymer is further cooled by counter-current flow of water entering the trough through line 39 and leaving through line 40. The coated wire is then wound on spool 41, the copolymer having been cooled below its softening temperature.

While this invention has been developed primarily for the coating and insulating of wire and cable intended for electrical uses, it can be meritoriously applied in other situations in which heat cracking is a problem. The discussion and examples of this specification have centered about electrical wire insulation because it was in this field that the problem of heat-stress cracking was recognized. Other applications for thermoplastic coatings are in covering wires and cables for nonelectrical uses, covering of metal pipe for equipment such as hand drills, arm rests, luggage racks and the like, and the covering of wood members, such as dowels, slats and the like.

To further clarify and illustrate my invention, the following examples are set forth which are intended to be exemplary only and not to limit unduly my invention.

*Examples*

Ethylene and propylene were copolymerized from a feed stock of 93.5 weight percent ethylene and 6.5 weight percent propylene in a reactor provided with a stirrer. Charged to the reactor were 189 parts by weight of cyclohexane to 1 part by weight of a chromium oxide-silica-alumina catalyst containing 2.5 weight percent chromium as chromium oxide. Ethylene and propylene were introduced simultaneously but in separate streams over a four hour period with continuous stirring. In all, 7.25 parts by weight of propylene was charged to the reactor. The reaction temperature was 240° F. and the pressure was 400 pounds per square inch gauge. A copolymer having the following properties resulted.

| | |
|---|---|
| Density | 0.936 |
| Melting point, ° F. | 237 |
| Melt index [1] | 0.196 |
| Brittleness temperature, ° F.[2] | less than −184 |
| Injection molded:[3] | |
| Tensile (pounds per square inch) | 2944 |
| Elongation (percent) | 62 |
| Compression molded: [4] | |
| Tensile (pounds per square inch) | 2520 |
| Elongation (percent) | 316 |
| Flex temperature, ° F.[5] | −20 |
| Flexural rigidity (pounds per square inch)[6] | 1.78 |
| Softening temperature, ° F.[7] | 247 |
| Heat distortion temperature, ° F.[8] | 122 |
| Impact strength, foot pounds per inch [9] | 3.09 |

[1] ASTM D1238–52T.
[2] ASTM D746–52T.
[3] ASTM D638–52T.
[4] ASTM D412–51T.
[5] Temperature at which the apparent modulus of rigidity, as determined by ASTM D1043–51, was 135,000 pounds per square inch.
[6] Measured using a simple flexibility test devised by D.C. Stechert of Gates Rubber Company and published at the 123rd national meeting of the American Chemical Society in Los Angeles in 1953.
[7] Adapted from method of Karrer, Davis, and Dieterich, Ind. Eng. Chem. (Anal. Ed.) 2, 96 (1930) described in specification.
[8] ASTM D648–45T.
[9] ASTM D256–47T, cantilever beam test (Izod type).

A homopolymer of ethylene was prepared in a continuous process in the presence of a chromium oxide-silica-alumina catalyst containing 2.37 weight percent chromium as chromium oxide. A cyclohexane solvent was used. The reaction temperature was 270° F. and the pressure was 420 pounds per square inch gauge. The polyethylene recovered from this polymerization had the following properties:

| | |
|---|---|
| Melting point, ° F. | 250 |
| Density | 0.960 |
| Melt index | 0.68 |
| Injection molded: | |
| Tensile (pounds per square inch) | 4690 |
| Elongation (percent) | 36 |
| Compression molded: | |
| Tensile (pounds per square inch) | 4130 |
| Elongation (percent) | 21 |
| Impact strength, foot pounds per inch | 3.44 |

Separate lengths of wire were coated with the homopolymer and the copolymer to which 0.2 weight percent of antioxidant N,N′-diphenyl-p-phenylenediamine had been added. The molten polymers were extruded on the wire and then cooled to approximately 77° F. at a slow enough rate to give void free adhesion to the wire. Each wire was cut into several lengths and samples were tested by wrapping each sample around its own diameter and subjecting it to elevated temperatures. The time for surface cracks to appear, that is, for the coating to fail, was noted for each sample. The following results were obtained.

*Time in hours for surface cracks to appear at the indicated temperature*

| | 221° F. | 194° F. | 167° F. |
|---|---|---|---|
| Ethylene-propylene copolymers | 24–39 | 24–39 | 400–425 |
| Polyethylene | 0–3 | 0–14 | 3–17 |

In the above table, the first number for each sample at a specific temperature indicates the maximum time at which no cracks were observed, and the second number indicates the time of the following reading at which cracks were observed. For example, at 221° F. for the ethylene-propylene copolymer the designation 24–39 is shown indicating that after 24 hours no cracks had appeared and that at the next reading, which was made at 39 hours, cracks had appeared.

It is evident from the above examples that this invention can be employed to produce an improved electrical insulation with good resistance to heat-stress cracking. It should be appreciated that the tests at which these samples were subjected are much more severe than field conditions. Winding the wire sample about its own diameter subjects the surface of the coating to severe stresses which generally exceed those encountered under normal conditions. The evaluation therefore must be comparative, and a marked improvement is evident for the copolymers over the homopolymer prepared by the same process.

I claim:

1. In a method of insulating an electrical conductor with a plastic coating having improved thermal properties which comprises heating to a fluid condition a copolymer of ethylene and at least one monoolefin selected from the group consisting of propylene, 1-butene and 2-butene, said copolymer being a polymerizate of a monomer system having been subjected to polymerizing conditions including a temperature between 150 and 450° F. and sufficient pressure to maintain the reactants in the liquid phase in the presence of an inert and liquid diluent and a polymerization catalyst, extruding said copolymer in a continuous coating on said conductor; and uniformly cooling said coating to a temperature below the softening temperature of said copolymer to give a void-free insulation, the improvement which comprises employing as said copolymer a copolymer which is a polymerizate of a monomer system comprising from 70 to 97 weight percent ethylene and which is characterized by a softening temperature of from 235 to 250° F., a density of at least 0.92 and a melt index of less than 1.

2. An article of manufacture comprising a wire coated with an insulating covering according to the process of claim 1.

3. In a method of insulating an electrical conductor with a plastic coating having improved thermal properties which comprises heating to a fluid condition a copolymer of ethylene and at least one monoolefin selected from the group consisting of propylene, 1-butene and 2-butene, said copolymer being a polymerizate of a monomer system having been subjected to polymerizing conditions including a temperature between 150 and 450° F. and sufficient pressure to maintain the reactants in the liquid phase in the presence of an inert and liquid saturated hydrocarbon diluent of from 3 to 12 carbon atoms per molecule and a catalyst comprising at least 0.1 weight percent chromium, a portion of which is hexavalent, as chromium oxide associated with at least one oxide selected from the group consisting of silica, alumina, thoria, and zirconia, extruding said copolymer in a continuous coating on said conductor; and uniformly cooling said coating to a temperature below the softening temperature of said copolymer to give a void-free insulation, the improvement which comprises employing as said copolymer a copolymer which is a polymerizate of a monomer system comprising from 70 to 97 weight percent ethylene and which is characterized by a softening temperature of from 235 to 250° F., a density of at least 0.92 and a melt index of less than 1.

4. In a method of insulating an electrical conductor with a plastic coating having improved thermal properties which comprises heating to a fluid condition a copolymer of ethylene and at least one monoolefin selected from the group consisting of propylene, 1-butene and 2-butene, said copolymer being a polymerizate of a monomer system having been subjected to polymerizing conditions including a temperature between 150 and 450° F. and sufficient pressure to maintain the reactants in the liquid phase in the presence of an inert and liquid saturated hydrocarbon diluent of from 3 to 12 carbon atoms per molecule and a catalyst comprising at least 0.1 weight percent chromium, a portion of which is hexavalent, as chromium oxide associated with at least one oxide selected from the group consisting of silica, alumina, thoria, and zirconia, extruding said copolymer in a continuous coating on said conductor; and uniformly cooling said coating to a temperature below the softening temperature of said copolymer to give a void-free insulation, the improvement which comprises employing as said copolymer a copolymer which is a polymerizate of a monomer system comprising from 85 to 97 weight percent ethylene and which is characterized by a softening temperature of from 235 to 250° F., a density of at least 0.92 and a melt index of less than 1.

5. A process according to claim 4 wherein said monoolefin is propylene.

6. A process according to claim 4 wherein said monoolefin is 1-butene.

7. A process according to claim 4 wherein said monoolefin is 2-butene.

8. An article of manufacture comprising a wire coated with an insulating covering according to the process of claim 4.

References Cited in the file of this patent

UNITED STATES PATENTS

| | | |
|---|---|---|
| 2,414,311 | Larson | Jan. 14, 1947 |
| 2,765,441 | Gambrill | Oct. 2, 1956 |
| 2,825,721 | Hogan et al. | Mar. 4, 1958 |

FOREIGN PATENTS

| | | |
|---|---|---|
| 564,324 | Great Britain | Sept. 22, 1944 |

OTHER REFERENCES

Industrial and Engineering Chemistry, vol. 48, No. 7, July 1956, pp. 1152–1164.